United States Patent
Shimamura

[19]

[11] Patent Number: 5,995,385
[45] Date of Patent: Nov. 30, 1999

[54] RCC-TYPE SWITCHING POWER SUPPLY

[75] Inventor: Takashi Shimamura, Saitama, Japan

[73] Assignee: Shindengen Electric Manufacturing Co., Ltd., Tokyo, Japan

[21] Appl. No.: 08/930,006

[22] PCT Filed: Apr. 10, 1997

[86] PCT No.: PCT/JP97/01235

§ 371 Date: Sep. 29, 1997

§ 102(e) Date: Sep. 29, 1997

[87] PCT Pub. No.: WO97/45948

PCT Pub. Date: Dec. 4, 1997

[30] Foreign Application Priority Data

May 28, 1996 [JP] Japan .................................. 8-156084
Jun. 3, 1996 [JP] Japan .................................. 8-162315

[51] Int. Cl.⁶ .................................................. H02M 3/335
[52] U.S. Cl. .................................. 363/21; 363/56; 363/97
[58] Field of Search .................................. 363/20, 21, 55, 363/56, 97, 131

[56] References Cited

U.S. PATENT DOCUMENTS

| | | | |
|---|---|---|---|
| 4,862,338 | 8/1989 | Tanaka ...................................... | 363/19 |
| 5,146,394 | 9/1992 | Ishii et al. .................................. | 363/16 |
| 5,369,307 | 11/1994 | Kobayashi ............................. | 307/125 |
| 5,383,106 | 1/1995 | Yoshida et al. ........................... | 363/15 |
| 5,570,278 | 10/1996 | Cross ........................................ | 363/20 |

FOREIGN PATENT DOCUMENTS 4-101663  4/1992  Japan .
6-70491  9/1994  Japan .

Primary Examiner—Shawa Riley
Attorney, Agent, or Firm—Armstrong, Westerman, Hattori, McLeland & Naughton

[57] ABSTRACT

An RCC-type switching power supply has a main switch means 9 which is repeatedly rendered conductive and cut off to cause a switching current to flow through a primary winding 31 for transferring energy from a primary side to a secondary side due to flyback operation. A snubber circuit 5a~5c has a snubber capacitor 7 and an auxiliary switch means 3 which are connected in series with each other and parallel to the primary winding 31. When the auxiliary switch means 3 is rendered conductive by an auxiliary winding 4 when the main switch means 9 is cut off, the auxiliary switch means 3 first effects third-quadrant operation to charge the snubber capacitor 7 with energy stored in a leakage inductance of the primary winding 31, and then effects first-quadrant operation to discharge the snubber capacitor 7 to cause a current to flow through the primary winding 31. The current transfers the energy to the secondary winding 32 or charges a smoothing capacitor 21 on the primary side to transfer the energy to a rectifying and smoothing means 18 on the primary side. Since no surge voltage is applied to the main switch means 9 and the energy stored in the leakage inductance is not wasted, the RCC-type switching power supply 2a~2c produces low noise and is highly efficient.

14 Claims, 9 Drawing Sheets

FIG.1(a)
RCC-Type Switching Power Supply
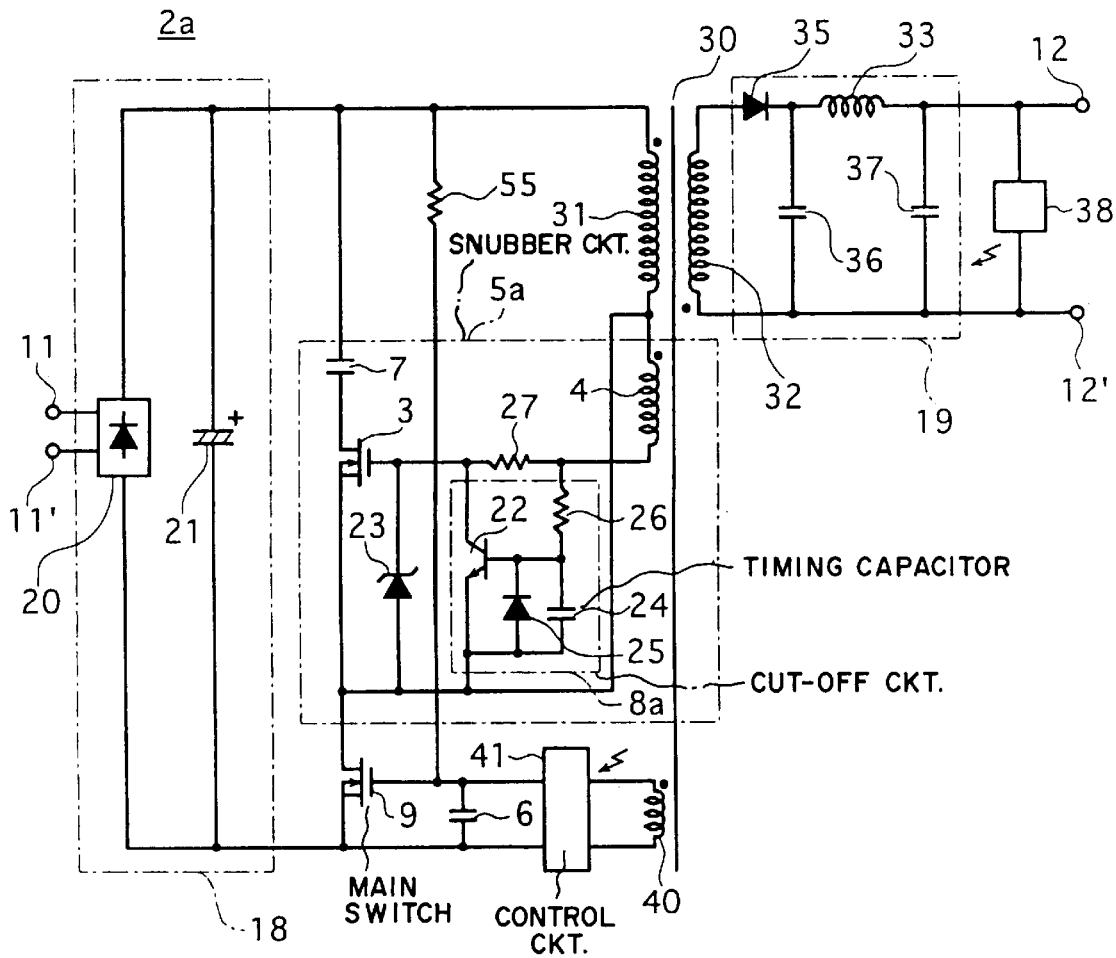
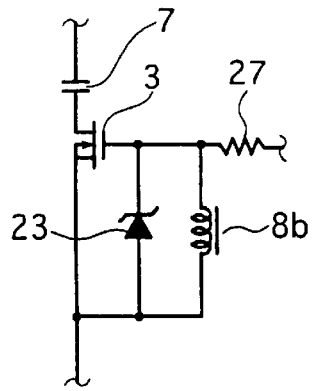
FIG.1(b)

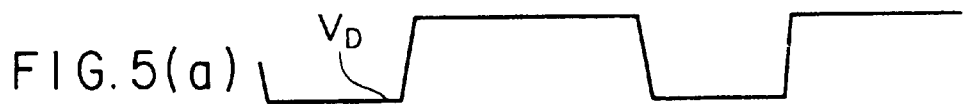
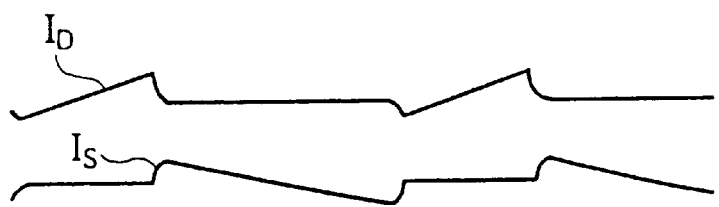
FIG. 5(a)
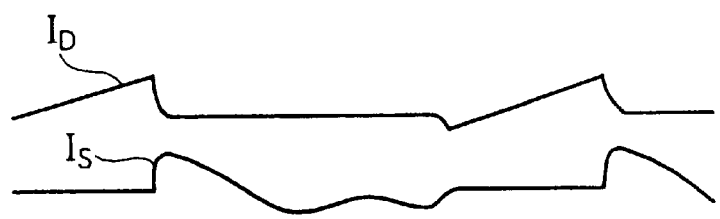
FIG. 5(b)
FIG. 5(c)

RCC-TYPE SWITCHING POWER SUPPLY

TECHNICAL FIELD

The present invention relates to an RCC-type switching power supply, and more particularly to an RCC-type switching power supply having a snubber circuit which employs third-quadrant operation of a MOSFET device.

BACKGROUND ART

Electronic devices for producing a given DC voltage from a commercial AC power supply are called a stabilized power supply, and roughly classified into a dropper power supply and a switching power supply. The switching power supply is widely used in general as it is inexpensive and highly efficient.

One conventional switching power supply is denoted at 102 in FIG. 9. The switching power supply 102 comprises a flyback RCC(ringing choke converter)-type switching power supply, and has a diode bridge 120, a smoothing capacitor 121 on a primary side, a transformer 130, and a main switching means 106.

The transformer 130 comprises a primary winding 131, a secondary winding 132, and an auxiliary winding 133 which are arranged so as to be magnetically coupled.

The main switching means 106 comprises an NPN transistor having a collector terminal connected to an end of the primary winding 131. The diode bridge 120 and the smoothing capacitor 121 constitute a rectifying and smoothing means on the primary side for rectifying and smoothing an AC voltage having a commercial frequency and applying the rectified and smoothed voltage between the other end of the primary winding 131 and an emitter terminal of the main switching means 106. Therefore, when a current is supplied to a base terminal of the main switching means 106, rendering it conductive, the primary winding 131 is supplied with a current from the rectifying and smoothing means on the primary side.

The auxiliary winding 133 is connected between the base and emitter terminals of the main switching means 106. When a base current is supplied to render the main switching means 106 conductive and a current starts to flow through the primary winding 131, a voltage is induced across the auxiliary winding 133 for increasing the base current. Therefore, the current flowing through the primary winding 131 increases progressively from the time when the main switching means 106 starts being conductive.

The secondary winding 132 is connected to a rectifying and smoothing means on the secondary side which comprises a diode 135 and a smoothing capacitor. Because of the rectifying action of the diode 135, when the main switching means 106 is rendered conductive and a current flows through the primary winding 131, no current flows through the secondary winding 132, and when the main switching means 106 is cut off and the current flowing through the primary winding 131 stops, a current flows through the secondary winding 132.

FIG. 10 shows operating waveforms of the RCC-type switching power supply 102. The waveform indicated by the reference numeral 151 represents the current flowing through the primary winding 131, and the waveform indicated by the reference numeral 152 represents the current flowing through the secondary winding 132.

The waveform indicated by the reference numeral 153 represents the collector voltage of the main switching means 106, with a low level showing a conducted state thereof and a high level showing a cut-off state thereof. When the main switching means 106 changes from the conducted state to the cut-off state, the energy stored in the primary winding 131 is transferred to the secondary winding 132, causing a current to flow through the secondary winding 132.

The transfer of the energy from the primary winding 131 to the secondary winding 132 is carried out by a magnetic coupling between the primary winding 131 and the secondary winding 132. Since the magnetic coupling is actually not 100%, not all the energy of the primary winding 131 is transferred to the secondary winding 132. With the RCC-type switching power supply, in particular, a large gap is present in the core of the transformer 130, thus lowering the magnetic coupling between the primary winding 131 and the secondary winding 132 thereby increase the leakage inductance of the primary winding 131.

A T-type equivalent circuit of the transformer 130 taking the leakage inductance into account is shown in FIG. 11(a). The reference character $L_0$ represents an exciting inductance (an inductance which contributes to the magnetic coupling between the primary winding 131 and the secondary winding 132), and the reference characters $L_1$, $L_2$ represent leakage inductances, respectively, of the primary winding 131 and the secondary winding 132. In the transformer 130 as a whole, the leakage inductances $L_1$, $L_2$ are added to the exciting inductance $L_0$ in the form of a T.

As can be seen from the equivalent circuit, if the transformer 130 is seen from the primary side thereof, the leakage inductance $L_1$ and the exciting inductance $L_0$ are in series with each other. Therefore, when the main switching means 106 is rendered conductive and a current $i_1$ flows through the primary winding 131, since the current $i_1$ flows through the leakage inductance $L_1$ and the exciting inductance $L_0$, energy is stored in these inductances.

When the main switching means 106 changes from the conducted state to the cut-off state under this condition, the energy stored in the exciting inductance $L_0$ is transferred to the secondary winding 132, causing a current $i_2$ to flow through the secondary winding 132. On the other hand, the energy stored in the leakage inductance $L_1$ is not transferred to the secondary winding 132, but generates an electromotive force across the leakage inductance $L_1$. Since the electromotive force is actually generated across the primary winding 131 in a direction to maintain the current $i_1$, it applies a surge voltage as indicated by the reference numeral 155 in FIG. 10 to the collector terminal of the main switching means 106.

The RCC-type switching power supply 102 has a snubber circuit 105 connected to the collector terminal of the main switching means 106. As shown in FIG. 11(b), when a voltage is generated across the primary winding 131 due to the electromotive force across the leakage inductance $L_1$, a diode 123 is rendered conductive, causing a current $i_3$ to flow therethrough to charge a snubber capacitor 124. With the snubber capacitor 124 being charged, the energy stored in the leakage inductance $L_1$ is transferred to the snubber capacitor 124, which absorbs the surge voltage to prevent the main switching means 106 from being destroyed.

When the charging of the snubber capacitor 124 is finished, the snubber capacitor 124 starts being discharged, causing a discharged current $i_4$ to flow in a closed current path made up of the snubber capacitor 124 and a resistor 125, as shown in FIG. 11(c), for thereby dissipating the energy stored in the leakage inductance $L_1$ as heat. When the snubber capacitor 124 is charged, since no current is limited, a pulse current indicated by the reference numeral 154 flows through the diode 123.

In the conventional snubber circuit 105, as described above, the snubber capacitor 124 is charged by the energy stored in the leakage inductance $L_1$. Inasmuch as the energy is finally consumed in its entirety by the resistor 123 and dissipated as heat, the energy stored in the leakage inductance $L_1$ is not effectively utilized. Consequently, the conventional RCC-type switching power supply 102 has been poor in electric power conversion characteristics and low in efficiency.

In the conventional snubber circuit 105, furthermore, a certain period of time (a time to conduct the diode in the forward direction) is required after the main switching means 106 has changed from the conducted state to the cut-off state, generating an electromotive force across the leakage inductance $L_1$, until the diode 123 is rendered conductive by the electromotive force, causing the current $i_3$ to flow. Since the discharging of the snubber capacitor 124 is not finished while the main switching means 106 is being cut off, a voltage which is the sum of the voltage produced by the rectifying and smoothing means on the primary side and the voltage across the snubber capacitor 124 is applied to the collector terminal of the main switching means 106 when the diode 123 is rendered conductive.

Because such a high surge voltage is applied to the collector terminal of the main switching means 106, the main switching means 106 needs to comprise a high-dielectric-strength device capable of withstanding such a surge voltage.

The present invention has been devised to solve the above problems of the prior art. It is an object of the present invention to provide an RCC-type switching power supply which produces a reduced amount of heat and is highly efficient.

Another object of the present invention is to provide an RCC-type switching power supply which does not produce a surge voltage.

DISCLOSURE OF THE INVENTION

An RCC-type switching power supply according to the present invention comprises main switch means arranged so as to be rendered repeatedly conductive and cut-off, a transformer having a primary winding and a secondary winding which are magnetically coupled to each other, rectifying and smoothing means on a primary side for supplying a current to the primary winding when the main switch means is rendered conductive, rectifying and smoothing means on a secondary side, for rectifying and smoothing a current supplied to the secondary winding by energy stored in the primary winding when the main switch means is cut off, and outputting the rectified and smoothed current from output terminals, and a driver winding magnetically coupled to the primary winding and the secondary winding, for inducing a voltage with remaining energy in the secondary winding when the current flowing through the secondary winding is eliminated, and changing the main switch means from a conducted state to a cut-off state with the induced voltage.

The RCC-type switching power supply also has a snubber circuit comprising a capacitive snubber capacitor, auxiliary switch means which comprises a MOSFET device, and an auxiliary winding, the snubber capacitor and the auxiliary switch means being connected in series with each other and parallel to the primary winding, the auxiliary winding being capable of generating a voltage when the main switch means is repeatedly rendered conductive and cut off.

The auxiliary switch means effects third-quadrant operation with the voltage generated by the auxiliary winding while the main switch means is being cut off, for charging the snubber capacitor with the energy stored in a leakage inductance of the primary winding, and then effects first-quadrant operation for discharging the snubber capacitor.

Generally, switching power supplies comprise a rectifying and smoothing circuit on a primary side, a rectifying and smoothing circuit on a secondary side, a transformer, and main switch means. The transformer has a primary winding and a secondary winding which are magnetically coupled to each other. The primary winding is connected to the main switch means. When the main switch means is rendered conductive, the primary winding is supplied with a current from the rectifying and smoothing circuit on the primary side.

When the main switch means is cut off, a current flows through the secondary winding with the energy which has been stored in the primary winding when the main switch means was in the conducted state. The current is then rectified and smoothed by a rectifying and smoothing circuit on a secondary side and supplied to a load. The main switch means is repeatedly rendered conductive and cut off to transfer energy from the primary side to the secondary side in an electrically insulated condition.

Of those switching power supplies, the RCC-type switching power supply according to the present invention effects flyback operation to transfer energy from the primary side to the secondary side. When the current flowing through the secondary winding is eliminated, a voltage is induced across the driver winding by remaining energy in the secondary winding.

The induced voltage has such a polarity as to change the main switch means from the cut-off state to the conducted state. When the main switch means is rendered conductive, the current flowing through the primary winding increases to forcibly cut off the main switch means or up to the limit of a current driving ability whereupon the main switch means from the conducted state to the cut-off state, supplying a current to the secondary winding.

The RCC-type switching power supply is a self-excited switching power supply, and the frequency of switching operation of the main switch means varies.

In order to maintain the output voltage at a constant voltage level, the output voltage is detected, and the period in which the main switch means is rendered conductive is increased or reduced by a control circuit for keeping the detected output voltage at a constant level.

In the RCC-type switching power supply according to the present invention, the auxiliary switch means of the snubber circuit comprises a MOSFET device. When the auxiliary switch means is rendered conductive, the auxiliary switch means first effects third-quadrant operation to charge the snubber capacitor with the energy stored in the leakage inductance of the primary winding, and then effects first-quadrant operation to discharge the snubber capacitor.

To describe operation of the above snubber circuit, a structure of a general power MOSFET device used in an RCC switching power supply will first be described for third- and first-quadrant operation with reference to FIG. 7.

The reference numeral 82 in FIG. 7 indicates an n-channel MOSFET device with a number of $p^+$-type body layers 83 diffused as islands on the surface of an $n^-$-type silicon substrate 80. $p^-$-type backgate regions 84 are diffused around the body layers 83, with $n^+$-type source layers 85 diffused in the body layers 83.

An $n^+$-type ohmic layer 86 is diffused in the reverse side of the silicon substrate 80, and a drain region 98 of an n⁻-type silicon epitaxial crystal is left between the body layers 83 and the ohmic layer 86.

A gate oxide film 88 and a gate electrode 87 are formed in the named order on the surfaces of the backgate regions 84 in the MOSFET device 82. When a positive voltage is applied to the gate electrode 87 with respect to the source layers 85, the surfaces of the p⁻-type backgate regions 84 are reversed, forming an n⁺-conductivity-type channel layer through which the source layers 85 of the same conductivity type and the drain region 98 are electrically connected.

A source electrode 90 is formed on the surfaces of the body layers 83 and the source layers 85 in short-circuiting relation thereto. In a normal mode of use of the MOSFET device as a semiconductor switch, a positive voltage is applied to the drain electrode 89 with respect to the source electrode 90. For rendering the MOSFET device 82 conductive, a positive voltage is applied to the gate electrode 87 to form an n⁺-type channel layer in the surfaces of the p⁻-type backgate regions 84, causing a current to flow from the drain electrode 89 to the source electrode 90.

Electric characteristics of the MOSFET device 82 will be described below with reference to a graph shown in FIG. 8.

The graph shown in FIG. 8 represents characteristics when a positive constant voltage is applied to the gate electrode 87 for form an n⁺-type channel layer in the surfaces of the p⁻-type backgate regions 84. The graph has a vertical axis indicative of a drain current $I_D$ and a horizontal axis of a drain-to-source voltage $V_{ds}$. When a positive voltage is applied to the drain electrode 89 with respect to the source electrode 90 (in the normal mode of use), the relationship between the drain-to-source voltage $V_{ds}$ and the drain current $I_D$ is represented by a waveform indicated by the solid line in the first quadrant shown in FIG. 8.

When a negative voltage is applied to the drain electrode 89 with respect to the source electrode 90, the relationship between the drain-to-source voltage $V_{ds}$ and the drain current $I_D$ is represented by a waveform indicated by the solid line in the third quadrant shown in FIG. 8.

Operation in the third quadrant of the MOSFET device 82 is called third-quadrant operation. In a range in which the drain-to-source voltage $V_{ds}$ is small in the third-quadrant operation, the MOSFET device 82 exhibits resistance characteristics.

In the MOSFET device 82, a parasitic capacitor 81 is formed between the p⁺-type body layers 83 and the drain region 98. The polarity of the voltage $V_{ds}$ applied between the drain and source for causing the MOSFET device 82 to effect the third-quadrant operation is of such a direction as to forward-bias the parasitic capacitor 81. Therefore, when the drain-to-source voltage $V_{ds}$ is equal to or greater than a forward conducting voltage (about 0.7 V at room temperature) of the parasitic capacitor 81, the parasitic capacitor 81 is rendered conductive, and the MOSFET device 82 exhibits diode characteristics.

Generally, a diode is of a high impedance and only a very small current flows therethrough if a voltage applied thereto in a forward direction is smaller than a forward conducting voltage. Therefore, if no n⁺-type channel layer is formed on the surfaces of the backgate regions 84 of the MOSFET device 82 and the MOSFET device 82 is cut off, then insofar as the drain-to-source voltage $V_{ds}$ is small, only a very small current flows between the drain and source due to the characteristics of the parasitic diode 81 (the broken-line characteristics shown in FIG. 8).

When the MOSFET device 82 is rendered conductive and effects the third-quadrant operation, since a current flows from the drain electrode 89 through the n⁺-type-inverted channel layer to the source electrode 90, a large current can flow even though the drain-to-source voltage $V_{ds}$ is small.

Operation in the first quadrant will be referred to as first-quadrant operation. When a voltage (which is positive with respect to the source terminal, but negative with respect to the source terminal in a p-channel MOSFET device) is applied to form an n⁺-type channel layer and the MOSFET device 82 is rendered conductive, the MOSFET device can effect either the first-quadrant operation or the third-quadrant operation depending on the potential relationship between the source terminal and the drain terminal.

A speed at which the third-quadrant operation is initiated is higher than with a pn-junction diode, and a voltage drop is small. Therefore, the amount of heat generated is smaller than when the pn-junction diode is employed. Thus, the efficiency of the RCC-type switching power supply is high.

Because of the third-quadrant operation of the auxiliary switch means 3, the auxiliary switch means remains conductive after the charging of the snubber capacitor is finished. Then, the auxiliary switch means starts the first-quadrant operation to discharge the snubber capacitor, causing a current to flow through the primary winding. The direction of the current flowing through the primary winding is opposite to the direction at the time when the main switch means was conducted. A voltage induced across the secondary winding by the current is directed to cause the rectifying and smoothing means on the secondary side to pass a current through the secondary winding. The voltage causes the current to flow through the secondary winding, transferring the energy stored in the snubber capacitor to the secondary side.

The energy stored in the leakage inductance is effectively transferred through the snubber capacitor to the secondary side. Additionally, since a voltage drop caused by the auxiliary switch means when the snubber capacitor is charged is small, the efficiency of the RCC-type switching power supply as a whole is increased.

The auxiliary winding may be magnetically coupled to the primary winding and the secondary winding, so that it is capable of generating the voltage as the main switch means operates, for thereby operating the auxiliary switch means.

Rather than magnetically coupling the auxiliary winding to the primary winding and the secondary winding, the auxiliary winding may be magnetically coupled to an insulating winding of the snubber circuit, and may be arranged such that a current flows through the insulating winding when the main switch means is repeatedly rendered conductive and cut off. Since the voltage is generated across the auxiliary winding when the current flows through the insulating winding, the auxiliary switch means may be operated. In order for a current to flow through the insulating winding, the voltage generated across the auxiliary winding may be applied to the insulating voltage.

If the auxiliary winding is not magnetically coupled to the primary winding and the secondary winding, as described above, the primary and secondary sides remain insulated even when the opposite terminals of the auxiliary winding are short-circuited, allowing an insulating sheet to be burned to cause the auxiliary winding and the insulating winding to be short-circuited.

When the auxiliary switch means is in the conducted state while the main switch means is being cut off, a vibrating current flows between the snubber capacitor and the primary winding. To prevent such a vibrating current from flowing, the snubber circuit may have a cut-off circuit for forcibly cutting off the auxiliary switch means which has been rendered conductive, during a period in which the main switch means is in the cut-off state.

An electric device that can be used in the cut-off circuit is a saturable reactor. The saturable reactor functions as an inductance device if a current flowing therethrough is lower than a predetermined value, and has its opposite terminals short-circuited if the current flowing therethrough exceeds the predetermined value. One of the terminals of the saturable reactor is connected to a gate terminal of the auxiliary switch means and the other of the terminals of the saturable reactor is connected to a source terminal of the auxiliary switch means. When a voltage is applied to the gate terminal and a current flowing through the saturable reactor progressively increases up to the predetermined value, short-circuiting the saturable reactor, the auxiliary switch means is automatically cut off. Therefore, the saturable reactor may be used as the cut-off circuit.

The main switch means may have a delay circuit, and when a period established by the delay circuit has elapsed after the voltage is induced across the driver winding by the remaining energy in the secondary winding, the main switch means may change from the conducted state to the cut-off state. The main switch means and the auxiliary switch means are thus prevented from being rendered conductive simultaneously.

The main switch means may comprise a MOSFET. With the MOSFET used, a current can flow therethrough in a direction opposite to a current which is supplied from the rectifying and smoothing means on the primary side to the primary winding. If the energy of the snubber capacitor cannot be transferred to the secondary side because the secondary side is under a light load when a current flows through the primary winding due to the energy stored in the snubber capacitor, then a current is supplied to flow in an opposite direction through the main switch means, charging a smoothing capacity of the rectifying and smoothing means on the primary side. Therefore, the energy stored in the leakage inductance can be utilized.

BRIEF DESCRIPTION OF THE DRAWINGS

FIG. 1(a) is a circuit diagram of a first embodiment of a preferred RCC-type switching power supply according to the present invention, and FIG. 1(b) is a fragmentary circuit diagram of a circuit where a saturable reactor is used as a cut-off circuit. FIGS. 5(a)–(c) are graphs illustrative of operation of a snubber circuit under a light load, a medium load, and a heavy load.

BEST MODE FOR CARRYING OUT THE INVENTION

Figure 2:
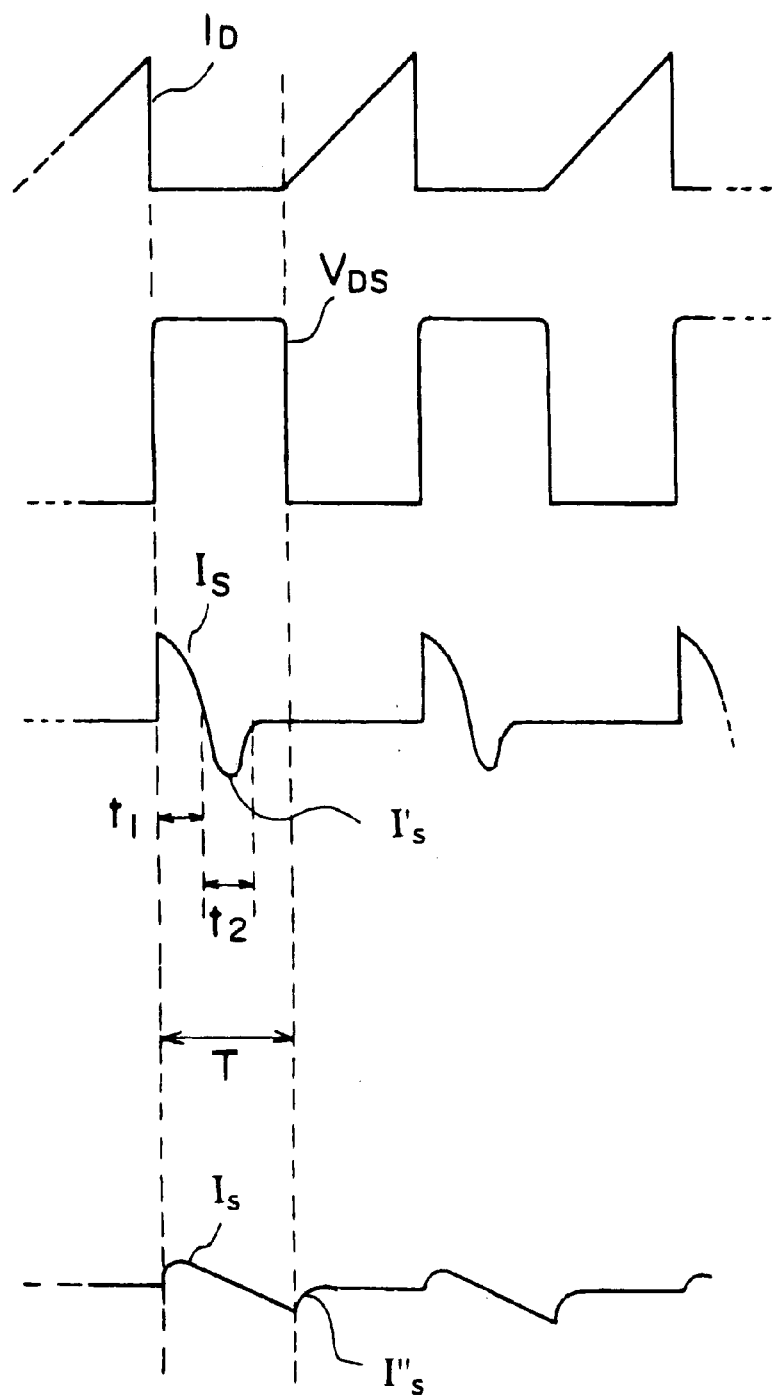
FIG. 2 is a diagram showing waveforms illustrative of operation of the first embodiment of the RCC-type switching power supply.

The reference character 2a in FIG. 1 indicates an RCC-type switching power supply according to a first embodiment of the present invention, which has a rectifying and smoothing means 18 on a primary side, a transformer 30, a main switch means 9, a snubber circuit 5a, and a rectifying and smoothing means 19 on a secondary side.

The rectifying and smoothing means 18 has a diode bridge 20 and a smoothing capacitor 21. When a power supply voltage having a commercial frequency is applied between input terminals 11, 11', it is full-wave-rectified by the diode bridge 20 and smoothed by the smoothing capacitor 21.

The transformer 30 comprises a primary winding 31, a secondary winding 32, an auxiliary winding 4, and a driver winding 40 which are magnetically coupled. The secondary winding 32 is electrically insulated from the primary winding 31, the auxiliary winding 4, and the driver winding 40.

The main switch means 9 comprises an n-channel MOSFET device. The primary winding 31 has a terminal connected to a drain terminal of the main switch means 9 and another terminal connected to a higher-potential terminal of the smoothing capacitor 21. The main switch means 9 has a source terminal connected to a lower-potential terminal of the smoothing capacitor 21. The voltage which has been smoothed by the smoothing capacitor 21 is applied to a series-connected circuit of the primary winding 31 and the main switch means 9. The driver winding 40 has a terminal connected to the drain terminal of the main switch means 9 and another terminal connected through a control circuit 41 to a gate terminal of the main switch means 9.

The rectifying and smoothing means 19 on a secondary side has a diode 35, a choke coil 33, and two smoothing capacitors 36, 37. The diode 35 is connected to a terminal of the secondary winding 32. When the main switch means 9 is rendered conductive, a current is supplied from the rectifying and smoothing means 18 on a primary side to the primary winding 31, inducing a voltage across the secondary winding 32. However, no current flows through the secondary winding 32 because of the rectifying action of the diode 35. When the main switch means 9 changes from the conducted state to a cut-off state, a current flows through the secondary winding 32 due to a voltage induced across the secondary winding 32.

The voltage induced across the secondary winding 32 is rectified by the diode 35, smoothed by the inductance 33 and the two smoothing capacitors 36, 37, and supplied from output terminals 12, 12' to a load.

The snubber circuit 5a of the RCC-type switching power supply 2a includes an auxiliary switch means 3 comprising an n-channel MOSFET device, a snubber capacitor 7 for absorbing a surge voltage, the auxiliary winding 4, a zener diode 23, a resistor 27, and a cut-off circuit 8a. The snubber capacitor 7 has a terminal connected to the higher-potential terminal of the smoothing capacitor 21 and another terminal connected to a drain terminal of the auxiliary switch means 3. The auxiliary switch means 3 has a source terminal connected to the drain terminal of the main switch means 9, and a gate terminal connected through the resistor 27 to a terminal of the auxiliary winding 4.

The other terminal of the auxiliary winding 4 is connected to the drain terminal of the main switch means 9 (the source terminal of the auxiliary switch means 3). The auxiliary winding 4 is magnetically coupled to the windings 31, 32, 40, and has such a polarity that when the main switch means 9 is cut off, a positive voltage is applied to the gate terminal of the auxiliary switch means 3.

The zener diode 23 is connected between the gate and source terminals of the auxiliary switch means 3. Even when a voltage is generated across the auxiliary winding 4, the zener diode 23 prevents a voltage higher than the zener voltage from being applied between the gate and source terminals, thus protecting the auxiliary switch means 3 from being destroyed.

The cut-off circuit 8a of the snubber circuit 5a comprises an NPN transistor 22, a timing capacitor 24, a diode 25, and a resistor 26. The NPN transistor 22 has a collector connected to the gate terminal of the auxiliary switch means 3, and an emitter terminal connected to the source terminal of the auxiliary switch means 3. The base terminal of the NPN transistor 22 is connected through the resistor 26 to the junction between the resistor 27 and the auxiliary winding 4.

The diode 25 is connected inversely between the base and emitter terminals of the NPN transistor 22, and the timing capacitor 24 is connected parallel to the diode 25.

Operation of the RCC-type switching power supply 2a will be described below with reference to a timing chart shown in FIG. 2. The reference character $I_D$ represents a drain current of the main switch means 9, and the reference character $V_{DS}$ represents a drain voltage thereof.

It is assumed that a voltage is applied to the gate terminal of the main switch means 9 by a starting resistor 55, starting to make the main switch means 9 conductive and cause the drain current $I_D$ to flow. Since the drain current $I_D$ flows through the primary winding 31, a voltage is induced across the driver winding 40. The voltage induced across the driver winding 40 is applied between the gate and source terminals of the main switch means 9. Since the polarity of the voltage is directed to render the main switch means 9 conductive, the current driving ability of the main switch means 9 is increased, increasing the drain current $I_D$. As a result, the voltage induced across the driver winding 40 is increased, thus forming a positive feedback loop between the drain current $I_D$ and the voltage induced across the driver winding 40, whereupon the main switch means 9 is completely conducted.

When the drain current $I_D$ is further increased beyond the current driving ability of the main switch means 9, the drain current $I_D$ can no longer be increased, whereupon the polarity of the voltage induced across the driver winding 40 is inverted, changing the main switch means 9 from the conducted state to the cut-off state.

In the RCC-type switching power supply 2a, the control circuit 41 is inserted between the gate and source terminals of the main switch means 9 for forcibly cutting off the main switch means 9 before the drain current $I_D$ is increased beyond the current driving ability of the main switch means 9.

When the main switch means 9 is cut off, a voltage is induced across the secondary winding 32 with such a polarity as to forward-bias the diode 35 on the secondary side. Therefore, a current flows through the secondary winding 32, transferring energy stored in the primary winding 31 to the smoothing capacitors 36, 37 and the choke coil 33 of the rectifying and smoothing means 19 on the secondary side.

However, energy stored in a leakage inductance of the primary winding 31 is not transferred to the secondary winding 32, but induces a voltage across the primary winding 31. The induced voltage is of such a polarity as to apply a positive voltage to the drain terminal of the main switch means 9 (and the source terminal of the auxiliary switch means 3). The potential at the source terminal of the auxiliary switch means 3 becomes higher than the potential at the drain terminal thereof.

When the main switch means 9 changes from the conducted state to the cut-off state, causing a current to flow through the secondary winding 32, a voltage having such a polarity as to apply a positive voltage to the gate terminal of the auxiliary switch means 3 is induced across the auxiliary winding 4. Since the auxiliary switch means 3 is rendered conductive, the auxiliary switch means 3 starts to effect third-quadrant operation thereby to charge the snubber capacitor 7 with the energy stored in the linkage inductance.

Figure 3A:
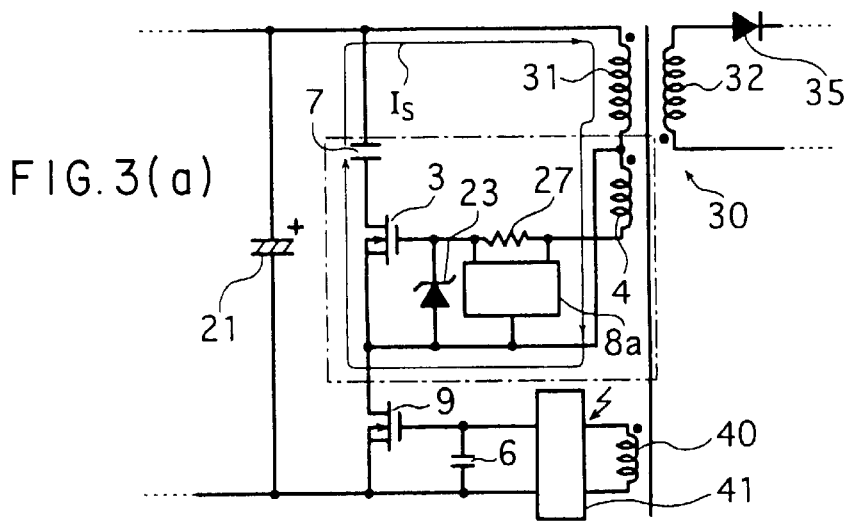
FIGS. 3(a)–(c) are circuit diagrams illustrative of operation of the first embodiment of the RCC-type switching power supply.

FIG. 2 shows a current $I_S$ to charge the snubber capacitor 7, with the direction from the source terminal to drain terminal of the auxiliary switch means 3 (the direction of the third-quadrant operation) being positive. The direction and path of the current $I_S$ are shown in FIG. 3(a).

A period in which the main switch means 9 is in the cut-off state is indicated by the reference character T in FIG. 2, and a period in which the snubber capacitor 7 is charged with the energy stored in the linkage inductance is indicated by the reference character $t_1$ ($t_1 < T$). The energy stored in the linkage inductance is transferred to the snubber capacitor 7 in the period $t_1$. The length of the period $t_1$ depends on the magnitude of the leakage inductance, the capacitance of the snubber capacitor 7, and the magnitude of the drain current $I_D$ that flows when the main switch means 9 changes to the cut-off state.

At the end of the period $t_1$, the energy stored in the linkage inductance has been transferred to the snubber capacitor 7. Thereafter, the voltage across the snubber capacitor 7 is applied through the primary winding 31 between the drain and source terminals of the auxiliary switch means 3, placing the drain voltage at a higher potential than the source terminal.

If it is assumed that the current keeps on flowing through the secondary winding 32 during the period T, then since the voltage for rendering the auxiliary switch means 3 conductive is induced across the auxiliary winding 4 after the elapse of the period $t_1$, the auxiliary switch means 3 starts first-quadrant operation, discharging the snubber capacitor 7 to cause a current to flow through the primary winding 31.

Figure 3B:
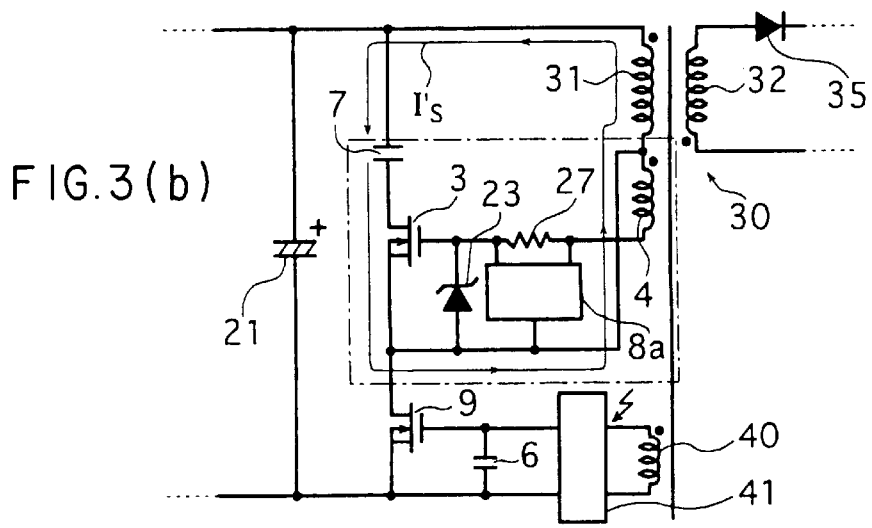

The direction and path of a current $I'_s$ which flows through the primary winding 31 upon discharging of the snubber capacitor 7 are shown in FIG. 3(b). The direction of the current $I'_s$ is opposite to the direction at the time when the main switch means 3 is in the conducted state. The current thus induces a voltage for forward-biasing the diode 35 across the secondary winding 32, causing a current to flow through the secondary winding 32. Because a current flows through the secondary winding 32 upon discharging of the snubber capacitor 7, the energy stored in the snubber capacitor 7 is transferred to the secondary side.

While the gate terminal of the auxiliary switch means 3 is kept at a higher potential than the source terminal thereof by the voltage induced across the auxiliary winding 4, the timing capacitor 24 of the cut-off circuit 8a is charged through the resistor 26. When the period $t_1$ and a period $t_2$ have elapsed, the voltage across the charged timing capacitor 24 forward-biases the NPN transistor 22 between the base and emitter thereof, rendering the NPN transistor 22 conductive.

A period in which the NPN transistor 22 is rendered conductive may be adjusted by the resistance of the resistor 26 and the capacitance of the timing capacitor 24. In the illustrated embodiment, the NPN transistor 22 is rendered conductive while the snubber capacitor 7 is being discharged.

The collector of the NPN transistor 22 is connected to a terminal of the resistor 27 and the gate terminal of the auxiliary switch means 3. Therefore, when the NPN transistor 22 is rendered conductive, no voltage is applied between the gate and source terminals of the auxiliary switch means 3, which is cut off. Therefore, when the main switch means 9 is rendered conductive, the auxiliary switch means 3 is cut off, so that no current flows through both the auxiliary switch means 3 and the main switch means 9.

Upon elapse of the period T, the energy transferred from the primary winding 31 to the secondary winding 32 is transferred to the smoothing capacitors 36, 37 and the choke coil 33, whereupon no current flows through the secondary winding 32.

Since slight remaining energy is stored in the secondary winding 32 at this time, a voltage is induced across the driver winding 40, changing the main switch means 9 from the cut-off state to the conducted state.

The main switch means 9 is thus rendered repeatedly conductive and cut off in transferring energy from the primary side to the secondary side. The control circuit 41 is connected to the gate terminal of the main switch means 9, and a voltage detecting circuit 38 is connected between the output terminals 12, 12'. The voltage detecting circuit 38 monitors the voltage between the output terminals 12, 12', and issues a monitored result to the control circuit 41 while being electrically isolated by a photocoupler. Based on the monitored result, the control circuit 41 controls the period in which the main switch means 9 is rendered conductive for keeping the voltage between the output terminals 12, 12' at a predetermined voltage value.

The period in which the main switch means 9 is cut off depends on the time spent until the energy stored in the secondary winding 32 is transferred to the smoothing capacitors 36, 37 and the choke coil 33. The period in which the main switch means 9 is rendered conductive is controlled by the voltage detecting circuit 38 and the control circuit 41.

A delay circuit 6 comprising a capacitor is connected between the gate and source terminals of the main switch means 9. The delay circuit 6 determines a time to be consumed after a voltage is induced across the driver winding 40 until the main switch means 9 is actually rendered conductive. The main switch means 9 does not start being rendered conductive while the auxiliary switch means 3 is in the conducted state.

As described above, the energy stored in the leakage inductance of the primary winding 31 is first transferred to the snubber capacitor 7 of the snubber circuit 5a and then to the secondary winding 32. Therefore, the energy stored in the leakage inductance is effectively utilized, but not becomes reactive power, thereby increasing the efficiency of the RCC-type switching power supply.

Since the auxiliary switch means 3 energized by the driver winding 40 quickly initiates the third-quadrant operation and the voltage across the snubber capacitor 7 is small when the main switch means 9 is rendered conductive, no surge voltage is applied to the main switch means 9. Therefore, the main switch means 9 may comprise a low-dielectric-strength MOSFET device.

Figure 3C:
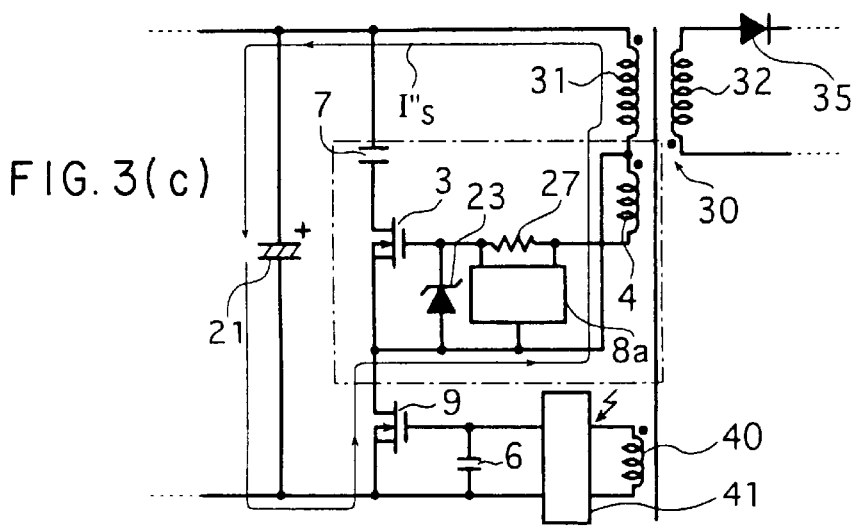

The currents $I_s$, $I'_s$ in FIGS. 2, 3(a), and 3(b) flow through the auxiliary switch means 3 under a rated load and a heavy load. Under a light load, the energy stored in the leakage inductance cannot fully be consumed by the secondary side. However, when the snubber capacitor 7 is discharged, the energy is transferred again to the primary winding 31, and when the main switch means 9 is rendered conductive, an opposite current flows through the main switch means 9 under an electromotive force induced across the primary winding 31, causing a current $I''_s$ shown in FIGS. 2 and 3(c) to flow thereby to charge the smoothing capacitor 21 on the primary side. Consequently, under a light load, the energy stored in the leakage inductance is returned to the smoothing capacitor 21 on the primary side, and will not be wastefully consumed.

The RCC-type switching power supply 2a described above employs the cut-off circuit 8a for rendering the NPN transistor 22 conductive to cut off the auxiliary switch means 3. The cut-off circuit 8a may be replaced with a cut-off circuit 8b comprising a saturable reactor as shown in FIG. 1(b).

Saturable reactors have such characteristics that they have an inductance when a current flowing therethrough is small, but when a current in excess of an allowable current value flows therethrough, the inductance disappears, and their opposite terminals are short-circuited. The cut-off circuit 8b which comprises a saturable reactor is connected between the source and gate terminals of the auxiliary switch means 3. When a voltage is applied between the source and gate terminals of the auxiliary switch means 3, rendering the auxiliary switch means 3 conductive, a current start flowing through the cut-off circuit 8b. Until the current reaches the allowable current value, the voltage is applied between the source and gate terminals of the auxiliary switch means 3, keeping the auxiliary switch means 3 conductive. However, when the current flowing through the cut-off circuit 8b exceeds the allowable current value, the opposite terminals of the cut-off circuit 8b are short-circuited, short-circuiting the gate and source terminals of the auxiliary switch means 3, which is then cut off.

As described above, the auxiliary switch means 3 is conducted as long as a current smaller than the allowable current value flows through the saturable reactor, and is cut off when the current reaches the allowable current value. Since an increase in the current flowing through the saturable reactor can be adjusted by the resistor 27, the period in which the auxiliary switch means 3 is rendered conductive can be controlled by the cut-off circuit 8b.

A second embodiment of the present invention will be described below.

Figure 4:
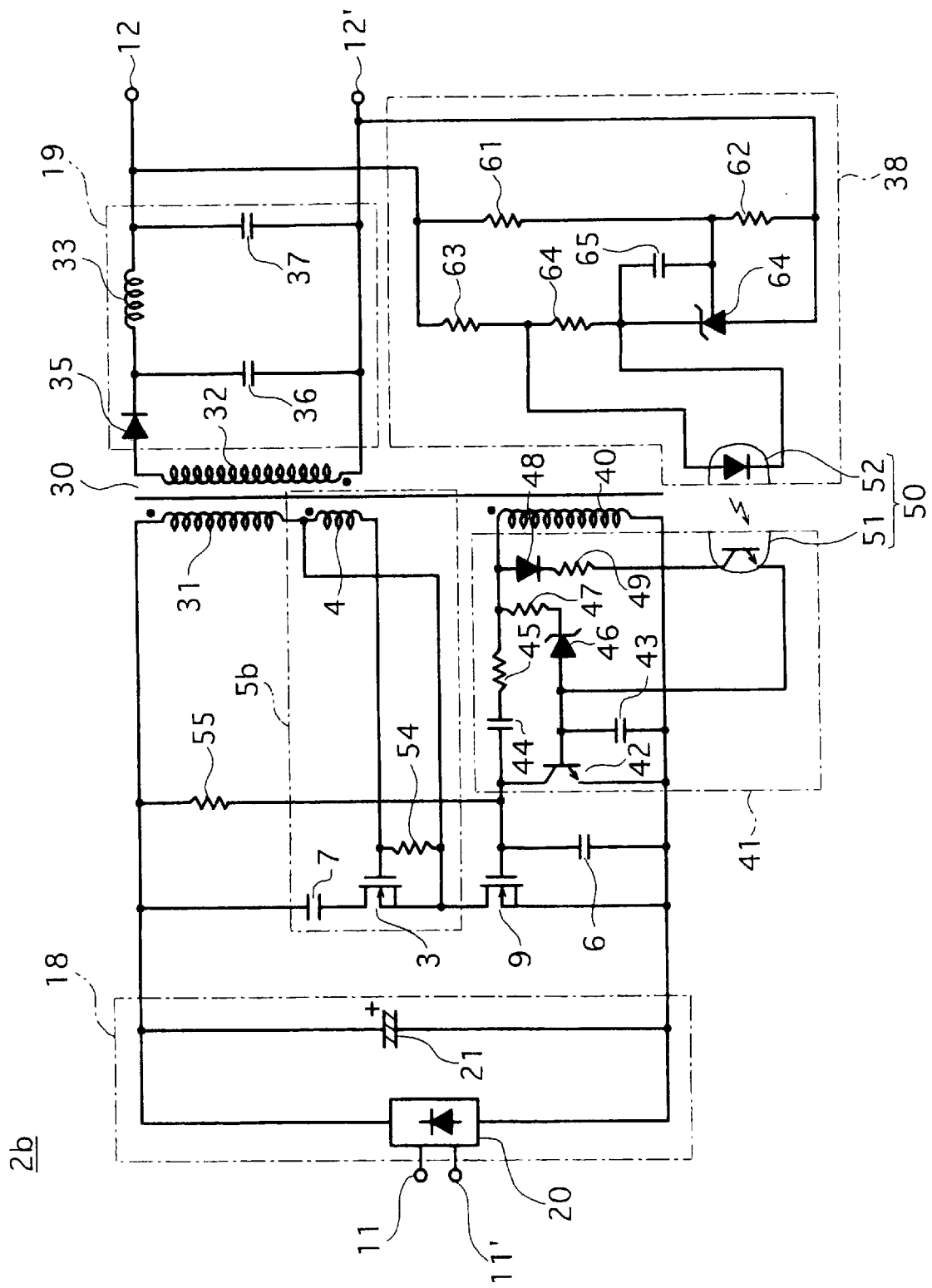
FIG. 4 is a circuit diagram of a second embodiment of a preferred RCC-type switching power supply according to the present invention.

The reference character 2b in FIG. 4 indicates an RCC-type switching power supply according to a second embodiment of the present invention. Those parts of the RCC-type switching power supply according to the second embodiment which are identical to the RCC-type switching power supply 2a are denoted by identical reference characters and will not be described below.

The RCC-type switching power supply 2b has a snubber circuit 5b which does not have the cut-off circuit 8a (or the cur-off circuit 8b) and the zener diode 23 in the RCC-type switching power supply 2a. A resistor 54 is connected instead of the cut-off circuit 8a, between the gate and source terminals of the auxiliary switch means 3, and the auxiliary switch means 3 is rendered repeatedly conductive and cut off by a voltage induced across the auxiliary winding 4.

Operation of the RCC-type switching power supply 2b is the same as the operation of the RCC-type switching power supply 2a except that the auxiliary switch means 3 is not forcibly cut off. Internal operation of a voltage detecting circuit 38 and a control circuit 41 of the RCC-type switching power supply 2b will be described below.

The control circuit 41 comprises a control transistor 42 which comprises an NPN transistor, a timing capacitor 43, a DC blocking capacitor 44, three resistors 45, 47, 49, a zener diode 46, a diode 48, and a phototransistor 51.

The control transistor 42 has an emitter connected to the source terminal of the main switch means 9 and a collector connected to the gate terminal thereof. The collector of the control transistor 42 is connected through the DC blocking capacitor 44 and the resistor 45 to a terminal of the driver winding 40, which is connected through the zener diode 46 and the resistor 47 to the base of the control transistor 42.

When the main switch means 9 is rendered conductive, causing a current to flow through the primary winding 31, a voltage is induced across the driver winding 40 with such a polarity as to render the main switch means 9 further conductive. When the voltage increases up to or beyond the zener voltage of the zener diode 46, the timing capacitor 43 between the base and emitter of the control transistor 42 starts being charged.

When the voltage across the timing capacitor 43 being charged increases up to or beyond a conducting voltage $V_{BE}$ for the control transistor 42, a current limited by the resistor 47 starts being supplied to the base of the control transistor 42, rendering the control transistor 42 conductive. The delay circuit 6 is rapidly discharged, cutting off the main switch means 9.

To the terminal of the driver winding 40 to which the resistors 45, 47 are connected, there is connected a terminal of a series-connected circuit of the diode 48 and the resistor 49, whose other terminal is connected to the collector of the phototransistor 51 that has an emitter connected to the base of the control transistor 42. When the phototransistor 51 is rendered conductive, a current is supplied through the diode 48 and the resistor 49 to the base of the control transistor 42. Since the current bypasses the resistor 47 and the zener diode 46, the base terminal of the control transistor 42 can be supplied with a current even if the voltage generated across the driver winding 40 is equal to or lower than the zener diode.

The phototransistor 51 is disposed in a photocoupler 50 which has a photodiode 52 that is optically coupled to the phototransistor 51 and placed in the voltage detecting circuit 38.

The voltage detecting circuit 38 comprises four resistors 61~64 and a variable-output constant-voltage IC (programable shunt regulator) 64.

The two resistors 63, 64 and the constant-voltage IC 64 are connected in series with each other and parallel to the smoothing capacitor 37 on the secondary side. The photodiode 52 is connected parallel to the resistor 64. The other two resistors 61, 62 are connected in series with each other and parallel to the smoothing capacitor 37. The constant-voltage IC 64 is supplied with a sampling voltage appearing at the junction between the resistors 61, 62.

The constant-voltage IC 64 is rendered conductive when the supplied sampling voltage becomes equal to or greater than a predetermined voltage (for example, about 2.5 V). Therefore, if the two resistors 61, 62 have equal resistances, the constant-voltage IC 64 is rendered conductive when a voltage $V_{out}$ between the output terminals 12, 12' reaches a value (5 V) that is twice the predetermined voltage, causing a current to flow through the photodiode 52. A capacitor 65 serves to prevent the constant-voltage IC 64 from oscillating.

While a current is flowing through the secondary winding 32, the smoothing capacitor 37 is continuously charged, increasing the voltage between the output terminals 12, 12'. When the constant-voltage IC 64 is rendered conductive, the photodiode 52 emits light, making the phototransistor 51 optically coupled thereto conductive.

Under this condition, the main switch means 9 is cut off. When the current flowing through the secondary winding 32 is eliminated, producing a voltage across the driver winding 40 to change from the cut-off state to the conducted state, the delay circuit 6 starts being charged, and the capacitor 43 starts being charged through the diode 48, the resistor 49, and the phototransistor 51.

The voltage across the delay circuit 6 increases to render the main switch means 9 conductive. Since the capacitor 43 has been charged, the control transistor 42 is rendered conductive in a short time after the main switch means 9 is made conductive, thereby cutting off the main switch means 9. Therefore, when the voltage between the output terminals 12, 12' is high, the timing capacitor 43 is charged by the phototransistor 51, accelerating the time to cut off the main switch means 9. Therefore, the period in which the main switch means 9 is made conductive is reduced, resulting in a reduction in the energy transferred from the primary side to the secondary side per unit time, so that the voltage $V_{out}$ between the output terminals 12, 12' is lowered.

With the RCC-type switching power supply 2b, when the main switch means 9 changes from the conducted state to the cut-off state, the energy stored in the leakage inductance of the primary winding 31 is transferred to the snubber capacitor 7 by the third-quadrant operation of the auxiliary switch means 3, and the snubber capacitor 7 is discharged by the first-quadrant operation of the auxiliary switch means 3. A current now flows through the primary winding 31 to transfer the energy to the secondary winding 32 (or charge the smoothing capacitor 21 on the primary side).

FIGS. 5(a)~(c) show waveforms of signals of the switching power supply 2b.

FIG. 5(a) shows the waveforms under a light load, FIG. 5(b) the waveforms under a medium load, and FIG. 5(c) the waveforms under a heavy load. As the load increases, the current flowing through the primary winding increases, and hence the energy stored in the leakage inductance increases, so that the current flowing through the snubber capacitor 7 also increases. In the graphs shown in FIGS. 5(a)~(c), the drain voltage $V_D$ of the main switch means 9 indicates the conducted state when in a low level and the cut-off state when in a high level.

A third embodiment of the present invention will be described below.

Figure 6:
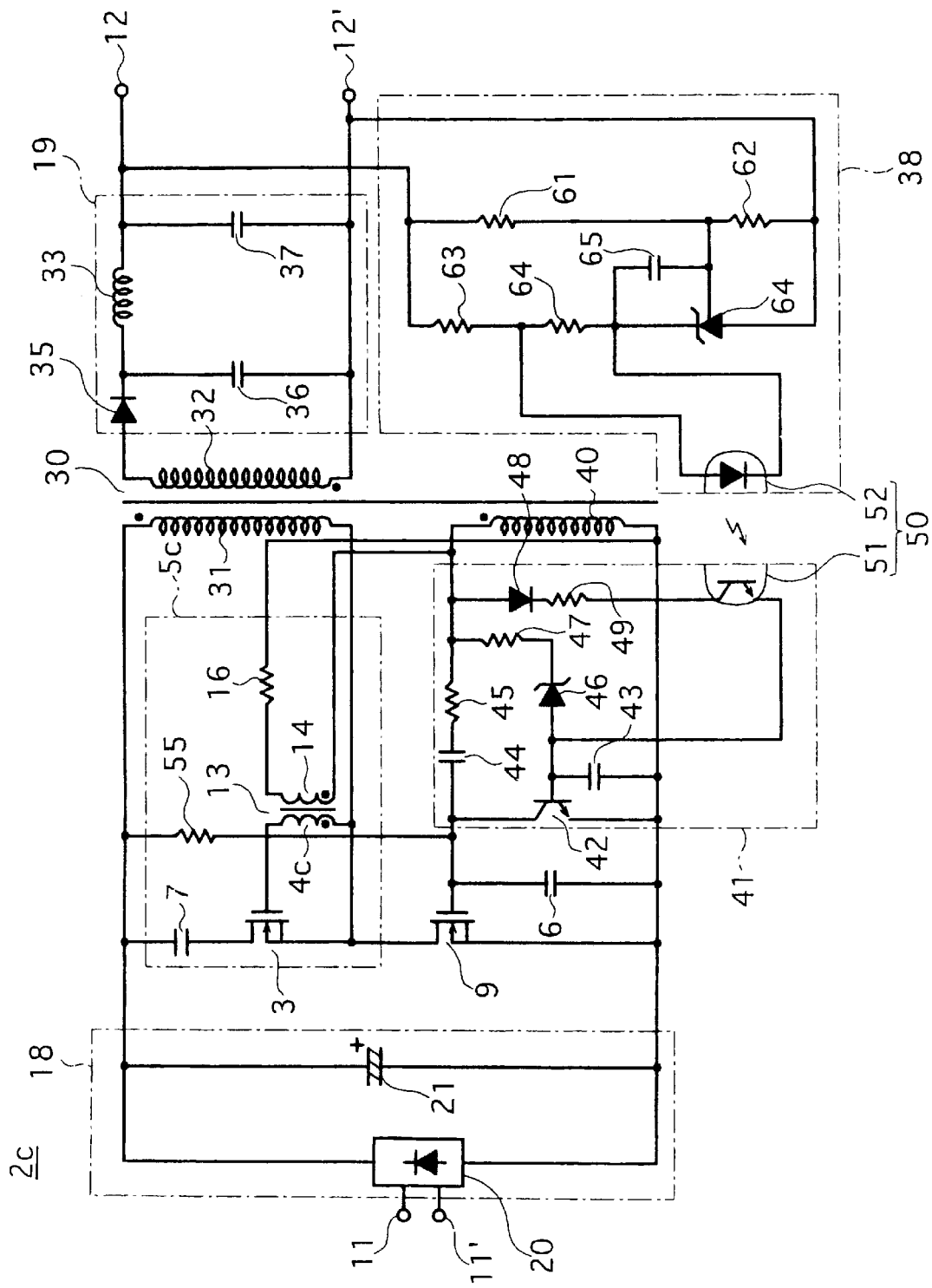
FIG. 6 is a circuit diagram of a third embodiment of a preferred RCC-type switching power supply according to the present invention.
Figure 7:
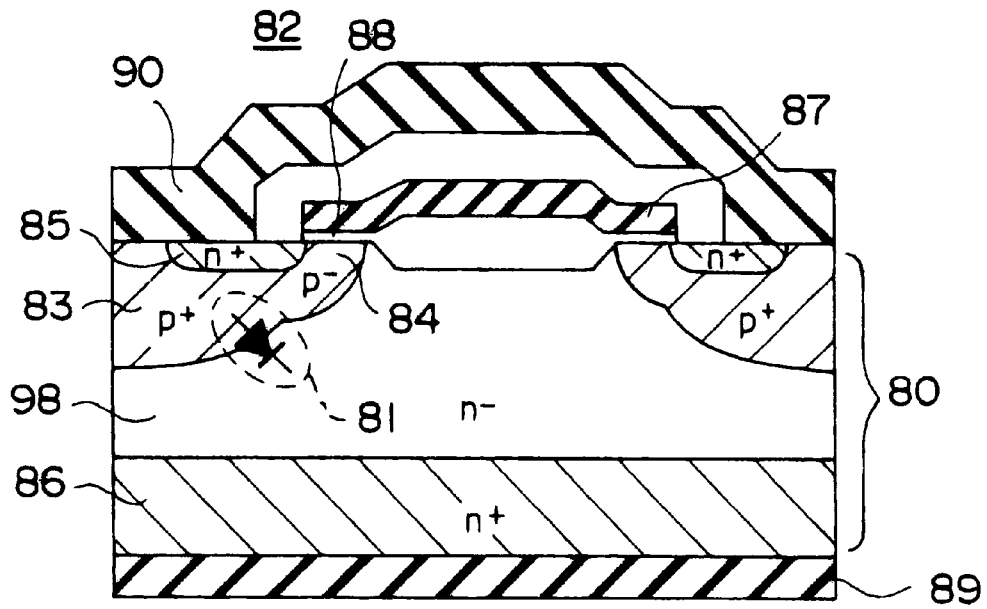
FIG. 7 is a cross-sectional view of an example of the structure of an MOSFET device that can be used in the present invention.
Figure 8:
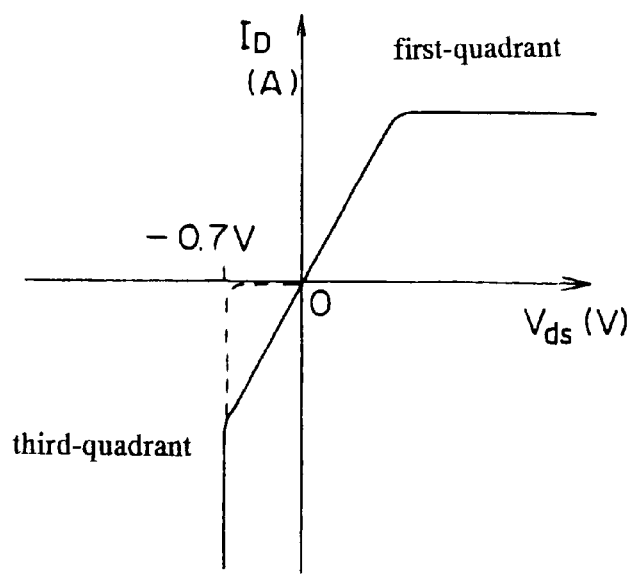
FIG. 8 is a graph showing characteristics of the MOSFET device.
Figure 9:
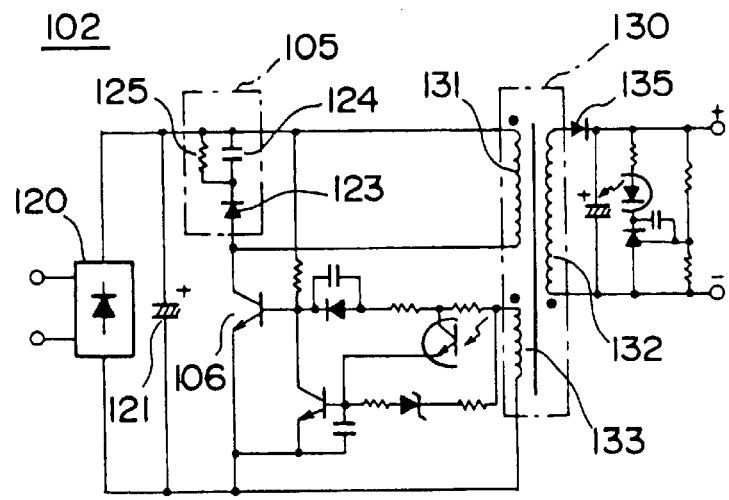
FIG. 9 is a circuit diagram of a conventional RCC-type switching power supply.
Figure 10:
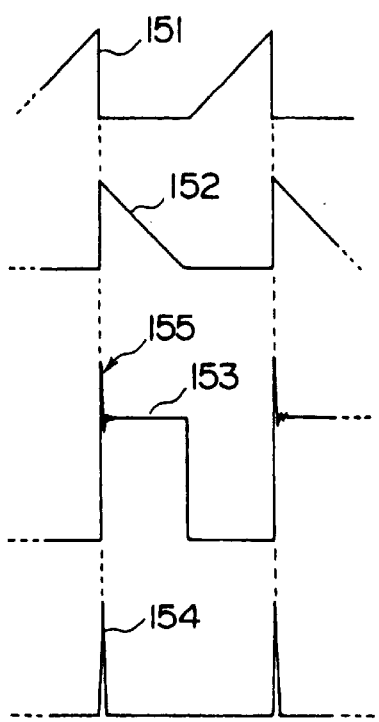
FIG. 10 is a diagram showing waveforms illustrative of operation of the conventional RCC-type switching power supply.
Figure 11A:
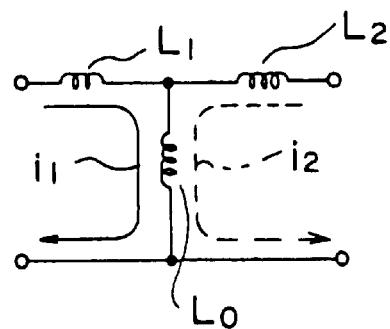
FIG. 11(a) is a circuit diagram of a T-type equivalent circuit of a transformer.
Figure 11B:
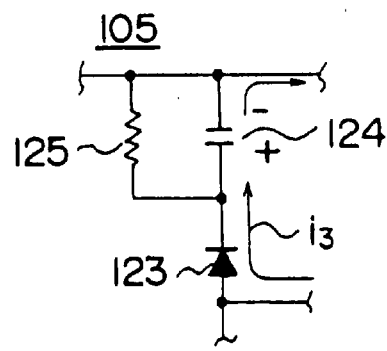
FIG. 11(b) is a fragmentary circuit diagram showing a charging path for a snubber capacitor of the conventional RCC-type switching power supply.
Figure 11C:
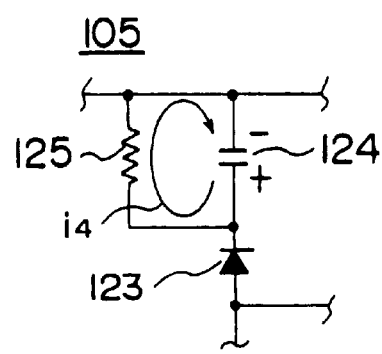
FIG. 11(c) is a fragmentary circuit diagram showing a discharging path for the snubber capacitor.

The reference character 2c in FIG. 6 indicates an RCC-type switching power supply according to a third embodiment of the present invention. Those parts of the RCC-type switching power supply according to the third embodiment which are identical to the RCC-type switching power supplies 2a, 2b are denoted by identical reference characters and will not be described below.

The RCC-type switching power supply 2c has a snubber circuit 5c which is different from the snubber circuits 5a, 5b. The snubber circuit 5c has a snubber capacitor 7, an auxiliary switch means 3, an auxiliary winding 4c, and an insulating winding 14. A series-connected circuit of the snubber capacitor 7 and the auxiliary switch means 3 is connected parallel to the primary winding 31. The insulating winding 14 and the auxiliary winding 4c are magnetically coupled to each other, thereby constituting an auxiliary transformer 13.

The insulating winding 14 has opposite terminals connected to respective opposite terminals of the driver winding 40. Therefore, when a voltage is induced across the driver winding 40, it is applied to the insulating winding 14.

A resistor 16 is inserted between the insulating winding 14 and the driver winding 40. When a voltage is induced across the driver winding 40, a current limited by the resistor 16 flows to the insulating winding 14, inducing a voltage across the auxiliary winding 4c in electrically insulated relationship to the insulating winding 14.

The auxiliary winding 4c has a terminal connected to the gate terminal of the auxiliary switch means 3 and another terminal connected to the source terminal thereof. When a voltage having such a polarity as to change the main switch means 9 from the conducted state to the cut-off state is induced across the driver winding 40, a voltage for rendering the auxiliary switch means 3 conductive is induced across the auxiliary winding 4c.

Therefore, when the main switch means 9 changes from the conducted state to the cut-off state, the auxiliary switch means 3 is rendered conductive and effects the third-quadrant operation to charge the snubber capacitor 7 with the energy stored in the leakage inductance of the primary winding 31.

When the charging of the snubber capacitor 7 is finished, the auxiliary switch means 3 effects the first-quadrant operation and discharges the snubber capacitor 7, causing a current to flow through the primary winding 31 to transfer the energy to the secondary side or charging the smoothing capacitor 21 on the primary side to transfer the energy to the rectifying and smoothing means 18 on the primary side.

When a voltage for rendering the main switch means 9 conductive is induced across the driver winding 40, a voltage for causing the insulating winding 14 to cut off the auxiliary switch means 3 is induced across the auxiliary winding 4c.

As described above, since the auxiliary winding 4c of the snubber circuit 5c is disposed in the auxiliary transformer 13 separate from the transformer 30, even when the auxiliary winding 4c is short-circuited, destroying the insulation between itself and the insulating winding 14, the short circuit is confined to the snubber circuit on the primary side, and the primary and secondary sides are not short-circuited.

In the snubber circuits 5a~5c described above, the auxiliary switch means 3 comprises an n-channel MOSFET device. However, the auxiliary switch means 3 may comprise a p-channel MOSFET device. The present invention covers any RCC-type switching power supply in which the MOSFET device effects the third-quadrant operation to cause energy stored in the leakage inductance of the primary winding to be stored in the snubber capacitor 7 and then the MOSFET device effects the first-quadrant operation to discharge the snubber capacitor 7 for thereby preventing the energy from being wastefully consumed.

The third- and first-quadrant operation of the MOSFET device may be carried out by the auxiliary winding.

In the above RCC-type switching power supplies 2a~2c, the main switching means 9 comprises an n-channel MOSFET device. However, the main switching means 9 may comprise a p-channel MOSFET device or a bipolar transistor with diodes inversely connected parallel to each other between the emitter and collector thereof.

Industrial applicability

Since a gap needs to be formed in the core of a transformer of an RCC-type switching power supply, the primary winding thereof has a greater leakage inductance than with externally excited switching power supplies. Therefore, it is necessary to effectively utilize the energy stored in the leakage inductance in order to increase the efficiency of the RCC-type switching power supply. A snubber circuit according to the present invention is particularly effective to increase the efficiency of the RCC-type switching power supply.

If the load is relatively heavy, the energy transferred from the leakage inductance to the snubber capacitor is transferred in its entirety to the secondary side when the snubber capacitor is discharged. When the load is relatively light, the energy charges the smoothing capacitor on the primary side. Therefore, the RCC-type switching power supply is highly efficient.

Because the MOSFET device quickly initiates the third-quadrant operation and the voltage across the snubber capacitor has been lowered when it starts being charged, no surge voltage is applied to the main switch means, and hence noise is small. The main switch means may comprise a low-dielectric-strength device.

In the RCC-type switching power supply according to the present invention, no current flows through both the main switch means and the auxiliary switch means. Therefore, the main switch means and the auxiliary switch means are prevented from being degraded, produce low noise, and are highly efficient.

I claim:

1. An RCC-type switching power supply comprising:

main switch means arranged so as to be rendered repeatedly conductive and cut-off;

a transformer having a primary winding and a secondary winding which are magnetically coupled to each other;

rectifying and smoothing means, operably coupled to said transformer, on a primary side for supplying a current to said primary winding when said main switch means is rendered conductive;

rectifying and smoothing means, operably coupled to said transformer, on a secondary side, for rectifying and smoothing a current supplied to said secondary winding by energy stored in said primary winding when said main switch means is cut off, and outputting the rectified and smoothed current from output terminals;

a driver winding magnetically coupled to said primary winding and said secondary winding, for inducing a voltage with remaining energy in said secondary winding when the current flowing through said secondary winding is eliminated, and changing said main switch means from a cut-off state to a conducted state with the induced voltage; and a snubber circuit, operably coupled to said main switch means, transformer, and rectifying and smoothing means, having a capacitive snubber capacitor, auxiliary switch means which comprises a MOSFET, and an auxiliary winding, said snubber capacitor and said auxiliary switch means being connected in series with each other and parallel to said primary winding, said auxiliary winding being capable of generating a voltage when said main switch means is repeatedly rendered conductive and cut off, wherein said auxiliary switch means of said snubber circuit effects third-quadrant operation with the voltage generated by said auxiliary winding, while said main switch means is being cut off, for charging said snubber capacitor with the energy stored in a leakage inductance of said primary winding, and then effects first-quadrant operation for discharging said snubber capacitor to cause a current to flow through said primary winding, and that said auxiliary switching means is forcibly cut off by a cut-off circuit in said snubber circuit during a period in which said main switching means is in the cut-off state.

2. An RCC-type switching power supply according to claim 1, wherein said auxiliary winding is magnetically coupled to said primary winding and said secondary winding and is capable of applying a voltage generated under an inductive electromotive force to a gate terminal of said auxiliary switching means.

3. An RCC-type switching power supply according to claim 1, wherein said snubber circuit has an insulating winding magnetically coupled to said auxiliary winding, the arrangement being such that a current flows through said insulating winding when said main switch means is repeatedly rendered conductive and cut off, and the voltage is generated across said auxiliary winding under an inductive electromotive force produced when the current flows through said insulating winding.

4. An RCC-type switching power supply according to claim 3, wherein the voltage generated across said auxiliary winding is applied to said insulating winding.

5. An RCC-type switching power supply according to any one of claims 1 through 4, wherein said cut-off circuit has a saturable reactor which can be short-circuited between opposite terminals thereof when a current flowing therethrough reaches a predetermined value, one of said terminals of said saturable reactor being connected to a gate terminal of said auxiliary switch means and the other of said terminals of said saturable reactor being connected to a source terminal of said auxiliary switch means.

6. An RCC-type switching power supply according to any one of claims 1 through 5, wherein said main switch means has a delay circuit, the arrangement being such that when a period established by said delay circuit has elapsed after the voltage is induced across said driver winding by the remaining energy in said secondary winding, said main switch means changes from the cut-off state to the conducted state.

7. An RCC-type switching power supply according to any one of claims 1 through 4, wherein said main switch means comprises a MOSFET.

8. A method of driving an RCC-type switching power supply having rectifying and smoothing means on a primary side, rectifying and smoothing means on a secondary side, main switching means, a transformer having a primary winding and a secondary winding which are magnetically coupled to each other, and a driver winding magnetically coupled to said primary winding and said secondary winding, comprising the steps of:

rendering said main switching means conductive and supplying a current from said rectifying and smoothing means on the primary side to said primary winding;

cutting off said main switching means, passing a current through said secondary winding due to energy stored in said primary winding, rectifying and smoothing the current with said rectifying and smoothing means on the secondary side, and outputting the rectified and smoothed current from output terminals; and inducing a voltage in said driver winding with remaining energy in said secondary winding when the current flowing through said secondary winding is eliminated, and changing said main switch means from a conducted state to a cut-off state with the induced voltage, characterized by the steps of:

providing a snubber circuit comprising a capacitive snubber capacitor, auxiliary switch means which comprises a MOSFET, and an auxiliary winding, in said RCC-type switching power supply;

connecting said snubber capacitor and said auxiliary switch means in series with each other and parallel to said primary winding;

connecting said auxiliary winding so as to generate a voltage when said main switch means is repeatedly rendered conductive and cut off;

applying the voltage generated in said auxiliary winding while said main switching means is being cut off to a gate terminal of said auxiliary switching means, for causing said auxiliary switching means to effect third-quadrant operation and transferring the energy stored in a leakage inductance of said primary winding to said snubber capacitor, and then causing said auxiliary switching means to effect first-quadrant operation for discharging said snubber capacitor.

9. A method according to claim 8, wherein said auxiliary winding is magnetically coupled to the primary winding and the secondary winding and is capable of applying a voltage generated under an inductive electromotive force to the gate terminal of said auxiliary switching means.

10. A method according to claim 8, wherein said snubber circuit has an insulating winding magnetically coupled to said auxiliary winding, the arrangement being such that a current flows through said insulating winding when said main switch means is repeatedly rendered conductive and cut off, and the voltage is generated across said auxiliary winding under an inductive electromotive force produced when the current flows through said insulating winding.

11. A method according to claim 10, wherein the voltage generated across said driver winding is applied to said insulating winding.

12. A method according to any one of claims 8 through 11, wherein said auxiliary switching means is forcibly cut off during a period in which said main switching means is in the cut-off state.

13. A method according to claim 12, wherein a saturable reactor has a terminal connected to the gate terminal of said auxiliary switch means and another terminal to a source terminal of said auxiliary switch means, and can be short-circuited between opposite terminals thereof when a current flowing therethrough reaches a predetermined value.

14. A method according to any one of claims 8 through 11, wherein said primary winding has a delay circuit, the arrangement being such that when a period established by said delay circuit has elapsed after the voltage is induced across said driver winding by the remaining energy in said secondary winding, said main switch means changes from the conducted state to the cut-off state.

\* \* \* \* \*